US012742223B2

(12) United States Patent
Arita et al.

(10) Patent No.: US 12,742,223 B2
(45) Date of Patent: Sep. 22, 2026

(54) NON-ORIENTED ELECTRICAL STEEL SHEET, METHOD FOR PRODUCING SAME, AND HOT-ROLLED STEEL SHEET

(71) Applicant: NIPPON STEEL CORPORATION, Tokyo (JP)

(72) Inventors: Yoshihiro Arita, Tokyo (JP); Shinichi Matsui, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 526 days.

(21) Appl. No.: 18/033,376

(22) PCT Filed: Nov. 27, 2020

(86) PCT No.: PCT/JP2020/044202
§ 371 (c)(1),
(2) Date: Apr. 24, 2023

(87) PCT Pub. No.: WO2022/113263
PCT Pub. Date: Jun. 2, 2022

(65) Prior Publication Data

US 2023/0366058 A1 Nov. 16, 2023

(51) Int. Cl.

| | |
|---|---|
| ***C21D 9/46*** | (2006.01) |
| ***C21C 7/00*** | (2006.01) |
| ***C21D 6/00*** | (2006.01) |
| ***C21D 8/12*** | (2026.01) |
| ***C21D 8/1205*** | (2026.01) |
| ***C21D 8/1216*** | (2026.01) |
| ***C21D 8/1244*** | (2026.01) |
| ***C21D 8/1277*** | (2026.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***H01F 1/147*** | (2006.01) |

(52) U.S. Cl.
CPC .............. *C21D 9/46* (2013.01); *C21C 7/0006* (2013.01); *C21D 6/005* (2013.01); *C21D 6/008* (2013.01); *C21D 8/1205* (2013.01); *C21D 8/1222* (2013.01); *C21D 8/1233* (2013.01); *C21D 8/1261* (2013.01); *C21D 8/1277* (2013.01); *C22C 38/001* (2013.01); *C22C 38/002* (2013.01); *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *H01F 1/14766* (2013.01); *C22C 2202/02* (2013.01)

(58) Field of Classification Search
None
See application file for complete search history.

(56) References Cited

U.S. PATENT DOCUMENTS

| | | | |
|---|---|---|---|
| 4,439,251 | A | 3/1984 | Shimoyama et al. |
| 2019/0017138 | A1 | 1/2019 | Uesaka et al. |

FOREIGN PATENT DOCUMENTS

| | | | | | |
|---|---|---|---|---|---|
| JP | 54-163720 | A | | 12/1979 | |
| JP | 63-195217 | A | | 8/1988 | |
| JP | 3-104844 | A | | 5/1991 | |
| JP | 2004-2954 | A | | 1/2004 | |
| WO | WO-2005100627 | A1 | * | 10/2005 | ........... C21D 8/1222 |

OTHER PUBLICATIONS

Machine translation of JPH03-104844A. (Year: 1991).*
Machine translation of WO2005100627A1. (Year: 2005).*

* cited by examiner

*Primary Examiner* — Xiaowei Su
(74) *Attorney, Agent, or Firm* — Birch, Stewart, Kolasch & Birch, LLP

(57) ABSTRACT

A non-oriented electrical steel sheet is provided which has a chemical composition that contains, in mass %, C: 0.0050% or less, Si: 0.10 to 1.50%, Mn: 0.10 to 1.50%, sol. Al: 0.0050% or less, N: 0.0030% or less, S: 0.0040% or less, and O: 0.0050 to 0.0200%, and contains one or more elements selected from a group of La, Ce, Zr, Mg and Ca in a total amount of 0.0005 to 0.0200%, with the balance being Fe and impurities. A number density N of suitable oxide particles is $3.0\times10^3$ to $10\times10^3$ particles/$cm^2$, and a number density n of oxide particles containing La and the like satisfies the expression $n/N\geq0.01$.

6 Claims, No Drawings

NON-ORIENTED ELECTRICAL STEEL SHEET, METHOD FOR PRODUCING SAME, AND HOT-ROLLED STEEL SHEET

TECHNICAL FIELD

The present invention relates to a non-oriented electrical steel sheet, a method for producing the non-oriented electrical steel sheet, and a hot-rolled steel sheet that serves as a starting material for the non-oriented electrical steel sheet.

BACKGROUND ART

In recent years, due to the growing demand globally for energy savings in electrical equipment, there is also a demand for higher performance characteristics with respect to non-oriented electrical steel sheets which are used as the iron core material of a rotary machine. Specifically, among motors of electrical products, models that are said to be high efficiency models are increasingly adopting high-grade starting materials in which the contents of Si and Al are increased to increase the resistivity and the crystal grain size is also made larger. On the other hand, while an improvement in performance is also being demanded for motors of general-purpose models, the reality is that, because of strict cost constraints, it is difficult to switch the materials of such models to the kind of high-grade starting materials that are used for high efficiency models.

A steel sheet required for a general-purpose model is a starting material that has a content of Si of 1.5% or less in which grain growth is caused to occur during stress relief annealing performed after motor core punching, to thereby dramatically improve iron loss. In order to promote grain growth during stress relief annealing, it is effective to reduce the amount of precipitates that are unavoidably mixed in the steel, or to make such precipitates harmless.

For example, Patent Document 1 discloses a method for producing an electrical iron sheet excellent in magnetic properties, characterized in that the method includes subjecting a hot-rolled sheet obtained by hot rolling a steel slab consisting of C: ≤0.065%, Si: ≤2.0%, Al: ≤0.10%, O: ≤0.020%, and B/N: 0.50 to 2.50, with the balance being Fe and unavoidable impurities to cold rolling one time or to cold rolling two or more times with intermediate annealing therebetween to obtain the final dimensions, and thereafter performing further annealing.

Patent Document 2 discloses a non-oriented electrical steel sheet having little iron loss, the non-oriented electrical steel sheet containing C: 0.015% or less, Si: 0.1 to 1.0%, sol. Al: 0.001 to 0.005%, Mn: 1.5% or less, S: 0.008% or less, N: 0.0050% or less, and T. O: 0.02% or less, that is characterized by a ratio of the weight of MnO with respect to the total weight of $SiO_2$, MnO, and $Al_2O_3$ that are three kinds of inclusions in the steel being 15% or less, the average crystal grain size 50 μm or more being achievable after magnetic annealing.

Patent Document 3 discloses a non-oriented electrical steel sheet that is excellent in magnetic properties, the non-oriented electrical steel sheet consisting of, in wt %, C: 0.01% or less, Si: 0.1% or more to 2.0% or less, Mn: 0.1% or more to 1.5% or less, and, in accordance with a deoxidization system of the steel, Al: 0.1% or less or Zr: 0.05% or less, with the balance being Fe and unavoidable impurity elements, characterized in that the number of oxide particles having a size with a diameter ranging from 0.5 μm or more to 5 μm or less in the steel is 1000 particles or more to 50000 particles or less per $cm^2$.

Patent Document 4 discloses a non-oriented electrical steel sheet which is composed of a steel containing, in mass %, C: 0.0050% or less, Si: 0.05 to 3.5%, Mn: 3.0% or less, Al: 3.0% or less, S: 0.008% or less, P: 0.15% or less, N: 0.0050% or less, and Cu: 0.2% or less, and satisfying the relation (S as Cu sulfide)/(S contained in the steel)≤0.2, or (S as Cu sulfide)/(S as Mn sulfide)≤0.2, and furthermore, the number density of sulfides containing Cu and having a diameter of 0.03 to 0.20 μm in the steel sheet is 0.5 particles/$\mu m^3$ or less.

Patent Document 5 discloses a non-oriented electrical steel sheet consisting of, in mass %, Si: 1.5% or less, Mn: 0.4% or more to 1.5% or less, sol. Al: 0.01% or more to 0.04% or less, Ti: 0.0015% or less, N: 0.0030% or less, S: 0.0010% or more to 0.0040% or less, and B in an amount such that B/N is 0.5 or more to 1.5 or less, with the balance being Fe and unavoidable impurities, wherein, among sulfides containing Mn, the numerical proportion of such sulfides which undergo composite precipitation with B precipitates is 10% or more, the total distribution density of MnS, $Cu_2S$, and complex sulfides thereof is $3.0\times10^5$ particles/$mm^2$ or less, and the distribution density of Ti precipitates having a diameter of less than 0.1 μm is $1.0\times10^3$ particles/$mm^2$ or less.

LIST OF PRIOR ART DOCUMENTS

Patent Document

Patent Document 1: JP54-163720A
Patent Document 2: JP63-195217A
Patent Document 3: JP3-104844A
Patent Document 4: JP2004-2954A
Patent Document 5: WO 2005/100627

SUMMARY OF INVENTION

Technical Problem

However, in the current situation in which further improvements in magnetic properties are needed, it has become difficult to produce a non-oriented electrical steel sheet in which the magnetic properties are adequately and stably improved by applying the aforementioned prior art.

An objective of the present invention, which has been made in view of the above problem, is to provide a non-oriented electrical steel sheet that has good grain growth properties during stress relief annealing, in which iron loss after stress relief annealing is low, and in which the magnetic flux density after stress relief annealing is high, a method for producing the non-oriented electrical steel sheet, and a hot-rolled steel sheet that can be used as a starting material for the non-oriented electrical steel sheet.

Solution to Problem

The present invention has been made to solve the above problem, and the gist of the present invention is a non-oriented electrical steel sheet, a method for producing the non-oriented electrical steel sheet, and a hot-rolled steel sheet which are described in the following.

(1) Anon-oriented electrical steel sheet having a chemical composition including, in mass %, C: 0.0050% or less, Si: 0.10 to 1.50%, Mn: 0.10 to 1.50%, sol. Al: 0.0050% or less, N: 0.0030% or less, S: 0.0040% or less, O: 0.0050 to 0.0200%, and one or more elements selected from a group of La, Ce, Zr, Mg and Ca: 0.0005 to 0.0200% in total, with the balance being Fe and impurities, wherein:

a number density N of oxide particles containing, in mass %, O: 20 to 60% and Si: 20 to 60%, and having a diameter of 1.0 to 5.0 μm is $3.0\times10^3$ to $10\times10^3$ particles/cm$^2$, and among the oxide particles, a number density n of oxide particles containing one or more elements selected from the group of La, Ce, Zr, Mg and Ca in a total amount of 1.0% by mass or more satisfies Formula (i) below:

$$n/N \geq 0.01. \quad \text{(i)}$$

(2) The non-oriented electrical steel sheet according to the above (1), wherein the chemical composition contains, in lieu of a part of the Fe, in mass %, Sn: 0.50% or less.

(3) The non-oriented electrical steel sheet according to the above (1) or (2), wherein:

an average spacing between the oxide particles is 30 to 300 μm.

(4) The non-oriented electrical steel sheet according to any one of the above (1) to (3), wherein:

an average crystal grain size is 30 μm or less, and an average crystal grain size after performing stress relief annealing under conditions of holding the non-oriented electrical steel sheet at 750° C. for two hours is 50 μm or more.

(5) A method for producing a non-oriented electrical steel sheet, that is a method for producing the non-oriented electrical steel sheet according to any one of the above (1) to (4), including:

a refining process of producing molten steel, a continuous casting process of subjecting the molten steel to continuous casting to produce a slab having a chemical composition according to the above (1) or (2), a hot rolling process of, after heating the slab that is obtained, performing hot rolling to obtain a hot-rolled steel sheet, a pickling process of performing pickling on the hot-rolled steel sheet, a cold rolling process of performing cold rolling on the hot-rolled steel sheet after pickling to obtain a cold-rolled steel sheet, and a finish annealing process of subjecting the cold-rolled steel sheet to finish annealing, wherein:

in the refining process, an oxygen amount of the molten steel before alloy addition is made, in mass %, 0.010 to 0.050%, and next, an amount M1 of Si added to the molten steel and a content M2 of Si in the slab are adjusted so as to satisfy Formula (ii) below; and a nozzle is used in the continuous casting process, a part or all of an inner wall of the nozzle that comes in contact with the molten steel being composed of a material that contains, in a total amount of 3 to 60% by mass %, oxides containing one or more selected from a group of La, Ce, Zr, Mg and Ca;

$$0.90 \leq M2/M1 \leq 1.10. \quad \text{(ii)}$$

(6) The method for producing a non-oriented electrical steel sheet according to the above (5), wherein:

in the refining process, a time period from when alloy addition ends until the continuous casting process is started is within a range of 30 to 180 minutes; and in the hot rolling process, after holding a temperature of the slab within a range of 1050° C. or more to less than 1150° C. for 15 to 240 minutes, hot rolling of the slab is immediately performed.

(7) The method for producing a non-oriented electrical steel sheet according to the above (5) or (6), wherein:

in the finish annealing process, a temperature of the cold-rolled steel sheet is made 800° C. or more to less than 850° C.

(8) A hot-rolled steel sheet which serves as a starting material for the non-oriented electrical steel sheet according to any one of the above (1) to (4), having a chemical composition containing, in mass %, C: 0.0050% or less, Si: 0.10 to 1.50%, Mn: 0.10 to 1.50%, sol. Al: 0.0050% or less, N: 0.0030% or less, S: 0.0040% or less, and O: 0.0050 to 0.0200%, and containing one or more elements selected from a group of La, Ce, Zr, Mg and Ca in a total amount of 0.0005 to 0.0200%, with the balance being Fe and impurities, wherein:

a number density N of oxide particles containing, in mass %, O of 20 to 60% and Si of 20 to 60%, and having a diameter of 1.0 to 5.0 μm is $3.0\times10^3$ to $10\times10^3$ particles/cm$^2$, and among the oxide particles, a number density n of oxide particles containing one or more elements selected from the group of La, Ce, Zr, Mg and Ca in a total amount of 1.0% by mass or more satisfies Formula (i) below:

$$n/N \geq 0.01. \quad \text{(i)}$$

(9) The hot-rolled steel sheet according to the above (8), wherein the chemical composition contains, in lieu of a part of the Fe, in mass %, Sn: 0.50% or less.

(10) The hot-rolled steel sheet according to the above (8) or (9), wherein:

an average spacing between the oxide particles is 30 to 300 μm.

ADVANTAGEOUS EFFECTS OF INVENTION

According to the present invention, a non-oriented electrical steel sheet which has good grain growth properties during stress relief annealing and which is excellent in magnetic properties can be stably provided at a low cost.

DESCRIPTION OF EMBODIMENT

When a non-oriented electrical steel sheet is to be used as a material for a machine component such as a motor core, first, machining such as punching is performed, and next, for example, stress relief annealing is performed under conditions in which the steel sheet is held at 750° C. for two hours. During the stress relief annealing, it is necessary to promote grain growth in the steel sheet, and to reduce the iron loss of the steel sheet. Therefore, the non-oriented electrical steel sheet must have a characteristic such that grain growth is promoted during stress relief annealing.

One of the factors that suppress grain growth during stress relief annealing is inclusions such as MnS that have a pinning effect. Conventionally, it has been considered that reducing the amount of S that is an element which generates inclusions is effective for promoting grain growth during stress relief annealing. However, S is an element that is unavoidably mixed in steel material, and a process that is performed to remove S increases the production cost. Further, although attempts have been made in the past to control the precipitation state of MnS by way of the hot rolling conditions, it cannot be said that such attempts have led to a sufficient improvement in the characteristics.

Here, the present inventors discovered that, when oxide particles are caused to finely precipitate at the stage of producing a cast piece that is to serve as the material for a non-oriented electrical steel sheet, the iron loss of the steel sheet after stress relief annealing improves. The present inventors considered that this is because MnS that has a pinning effect precipitates on the surface of refined oxide particles and is thereby made harmless. In addition, the present inventors found that, among oxide particles, oxide particles which contain O: 20 to 60% and Si: 20 to 60% and which have a diameter of 1.0 to 5.0 μm (hereunder, also referred to as "suitable oxide particles") in particular have a noticeable effect of making inclusions harmless, and it is possible to improve the iron loss of a steel sheet by optimizing the number density of such oxide particles.

However, as the result of conducting further earnest research, the present inventors found that, by only controlling the number density of the suitable oxide particles as described above, an effect that stably makes MnS harmless is not obtained, and grain growth during stress relief annealing is suppressed at a certain rate.

Therefore, the present inventors conducted studies regarding a method for stably making MnS harmless, and conceived of fixing S by utilizing one or more elements selected from La, Ce, Zr, Mg and Ca. However, when these elements were simply added, coarse inclusions containing these elements were formed and an effect of making S harmless was not sufficiently obtained.

As a result of trying various addition methods with respect to the elements such as La, the present inventors discovered that when oxides containing these elements are used in the inner wall of a nozzle that is used during continuous casting, and these elements are added to the molten steel by utilizing the melting loss of the nozzle, La and the like do not form inclusions individually, but rather are contained in the aforementioned suitable oxide particles and finely disperse. By this means, an effect that stably makes MnS harmless is obtained. Note that, it is not necessary that La and the like are contained in all of the suitable oxide particles, and the effect is sufficiently exhibited if La and the like are contained in some of the suitable oxide particles.

The present invention has been made based on the above findings. The respective requirements of the present invention are described hereunder.

1. Chemical Composition

The chemical composition of a non-oriented electrical steel sheet and a hot-rolled steel sheet according to one embodiment of the present invention will now be described. The reasons for limiting each element are as follows. Note that, the symbol "%" with respect to content in the following description means "mass percent".

C: 0.0050% or Less

C causes iron loss due to magnetic aging to deteriorate. Therefore, the content of C is to be 0.0050% or less. Preferably, the content of C is 0.0030% or less, or 0.0020% or less. Note that, since C is not necessary for the non-oriented electrical steel sheet according to the present embodiment, the lower limit value of the content of C is 0%. However, taking into consideration the cost of removing C that is mixed into the steel sheet as an impurity, for example, the lower limit value of the content of C may be set to 0.0001%, 0.0002%, or 0.0005%.

Si: 0.10 to 1.50%

Si is an effective element for increasing electrical resistance. In addition, Si is an essential element for forming the aforementioned suitable oxide particles. However, if Si is contained in an amount that is more than 1.50%, an increase in the hardness, a decrease in the magnetic flux density, and an increase in the production cost and the like of the non-oriented electrical steel sheet will occur. Therefore, the content of Si is to be 0.10 to 1.50%. The content of Si is preferably 0.20% or more, 0.40% or more, or 0.80% or more. Further, the content of Si is preferably 1.40% or less, 1.20% or less, or 1.00% or less.

Mn: 0.10 to 1.50%

Mn not only forms sulfide, but is also an effective element for increasing the electrical resistance of the non-oriented electrical steel sheet. Further, Mn has an effect of preventing hot cracking. However, when the content of Mn is excessive, the transformation temperature decreases too much, and the crystal grain size cannot be made large during stress relief annealing. Therefore, the content of Mn is to be 0.10 to 1.50% or less. The content of Mn is preferably 0.20% or more, 0.40% or more, or 0.80% or more. Further, the content of Mn is preferably 1.40% or less, 1.20% or less, or 1.00% or less.

Sol. Al: 0.0050% or Less

Al is an element that is usually used for deoxidizing steel. However, in the present invention, since deoxidization is performed by utilizing Si, Al is not necessary for the non-oriented electrical steel sheet according to the present embodiment. Further, if Al is excessively contained, it will be difficult for suitable oxide particles containing Si to be formed. Accordingly, the content of sol. Al is to be 0.0050% or less. The content of sol. Al is preferably 0.0045% or less, or 0.0040% or less. However, taking into consideration the cost of removing Al that is mixed into the steel sheet as an impurity, for example, the lower limit value of the content of sol. Al may be set to 0.0001%, 0.0002%, or 0.0005%.

N: 0.0030% or Less

N is an element that forms nitrides and has a risk of inhibiting grain growth. Accordingly, the content of N is preferably reduced as much as possible. However, it is industrially difficult to make the content of N that mixes into the steel as an impurity zero. In the present invention, as a harmless allowable amount, the content of N is to be 0.0030% or less. Further, a lower limit value of the content of N may be 0.0001%, 0.0002%, or 0.0005%.

S: 0.0040% or Less

S is an element that forms sulfides and has a risk of inhibiting grain growth. Accordingly, the content of S is preferably reduced as much as possible. However, it is industrially difficult to make the content of S that mixes into the steel as an impurity zero. In the present invention, S is caused to precipitate on the surface of oxide particles to thereby make S harmless. However, if the content of S is more than 0.0040%, the precipitated amount of sulfides will itself increase, and it will be difficult to make S harmless and consequently grain growth will be inhibited. Therefore, the content of S is to be 0.0040% or less. Further, a lower limit value of the content of S may be set to 0.0001%, 0.0002%, or 0.0005%.

O: 0.0050 to 0.0200%

O is an essential element for forming oxides. If the content of O is too small, it will not be possible to secure the necessary amount of oxide particles. On the other hand, if the content of O is more than 0.0200%, not only will the effect thereof be saturated, but the number density of suitable oxide particles will be excessive and these suitable oxide particles will agglomerate. Therefore, the content of O is to be 0.0050 to 0.0200%. The content of O is preferably 0.0055% or more, 0.0060% or more, or 0.0080% or more. Further, the content of O is preferably 0.0180% or less, 0.0150% or less, or 0.0100% or less.

One or more selected from the group consisting of La, Ce, Zr, Mg and Ca: 0.0005 to 0.0200% in total By causing La, Ce, Zr, Mg and Ca to be contained in oxide particles that mainly consist of O and Si, an effect that makes sulfides harmless more effectively and stably is obtained. On the other hand, if the content of these elements is excessively increased, the oxygen amount in the steel will decrease, and in addition, these elements will form coarse single oxide particles and the aforementioned effect will not be obtained. Therefore, the content of one or more elements selected from the group consisting of La, Ce, Zr, Mg and Ca is to be 0.0005 to 0.0200% in total. The total content of these elements is preferably 0.0008% or more, 0.0010% or more, or 0.0020% or more, and preferably is 0.0150% or less, 0.0100% or less, 0.0080% or less, 0.0070% or less, or 0.0060% or less. Note that, since the actions and effects of La, Ce, Zr, Mg and Ca are substantially the same in the non-oriented electrical steel sheet according to the present embodiment, the contents of these are defined by the total content.

Sn: 0.50% or Less

In the present invention, Sn is not essential. However, Sn has an action that suppresses nitriding and oxidation of the steel sheet surface during stress relief annealing, and is also an effective element for improving magnetic flux density. For these reasons, an appropriate amount of Sn may be contained. However, even if Sn is contained in an amount that is more than 0.50%, the effect will be saturated, and furthermore the production cost will be increased. Therefore, when contained, the content of Sn is to be 0.50% or less. The content of Sn is preferably 0.45% or less, 0.40% or less, or 0.30% or less. Note that, when it is desired to obtained the aforementioned effect, the content of Sn is preferably set to 0.01% or more, 0.02% or more, 0.03%, or 0.05%.

In the chemical composition of the non-oriented electrical steel sheet and the hot-rolled steel sheet according to the present embodiment, the balance is Fe and impurities. The term "impurities" refers to components which, when industrially producing the steel material, are mixed in from the raw material such as ore or scrap or due to various factors in the production process, and which are allowed within a range not adversely affecting the non-oriented electrical steel sheet according to the present embodiment.

2. Oxide Particles

Oxide particles which the non-oriented electrical steel sheet and the hot-rolled steel sheet according to the present embodiment contain will now be described. The non-oriented electrical steel sheet and the hot-rolled steel sheet according to the present embodiment contain suitable oxide particles which contain, in mass %, O: 20 to 60% and Si: 20 to 60%, and which have a diameter of 1.0 to 5.0 μm. A number density N of the suitable oxide particles is $3.0\times10^3$ to $10\times10^3$ particles/cm$^2$. The number density of the suitable oxide particles is measured in a cross section of the non-oriented electrical steel sheet and the hot-rolled steel sheet, and therefore the number density is defined as a number of particles per unit area.

As mentioned above, sulfides such as MnS that hinder grain growth in the non-oriented electrical steel sheet are made harmless by oxide particles. It is estimated that the mechanism by which this occurs is as follows. During casting of a slab which is to serve as the material for the non-oriented electrical steel sheet, the oxide particles are formed first, followed by the precipitation of MnS. Here, the MnS precipitates on the surface of the oxide particles. When a large amount of oxide particles having a predetermined particle size are formed in the molten steel, the number of sites where MnS precipitates increases, and by this means the MnS is made harmless.

Oxide particles that are effective for causing MnS to finely disperse are those whose chemical composition contains, in mass %, O: 20 to 60% and Si: 20 to 60%. It is considered that it tends to be difficult for MnS to precipitate on the surfaces of oxide particles whose chemical composition is outside the above range. Accordingly, in the non-oriented electrical steel sheet and the hot-rolled steel sheet according to the present embodiment, among the oxide particles, the number density of oxide particles which have the aforementioned chemical composition is defined.

Further, among the oxide particles which have the aforementioned chemical composition, oxide particles having a diameter of 1.0 to 5.0 μm are effective from the viewpoint of promoting grain growth. Oxide particles having a diameter that is less than 1.0 μm are not preferable since the oxide particles themselves inhibit grain growth. Further, if the amount of coarse oxide particles having a diameter of more than 5.0 μm increases, the number density of the oxide particles will decrease. Accordingly, in the non-oriented electrical steel sheet and the hot-rolled steel sheet according to the present embodiment, the number density of oxide particles having a diameter of 1.0 to 5.0 μm is defined.

The number density N of suitable oxide particles satisfying the aforementioned requirements is $3.0\times10^3$ to $10\times10^3$ particles/cm$^2$. If the number density N of the suitable oxide particles is less than $3.0\times10^3$ particles/cm$^2$, the number of precipitation sites of MnS will be insufficient, and it will not be possible to make MnS harmless. On the other hand, if the number density N of the suitable oxide particles is more than $10\times10^3$ particles/cm$^2$, it will be difficult to uniformly disperse the suitable oxide particles. In other words, if the number density of the suitable oxide particles is excessive, these suitable oxide particles will agglomerate and an effect of finely dispersing MnS will not be obtained. The number density N of the suitable oxide particles is preferably $3.5\times10^3$ particles/cm$^2$ or more, $4.0\times10^3$ particles/cm$^2$ or more, or $5.0\times10^3$ particles/cm$^2$ or more.

Note that, the number density of oxide particles which do not satisfy the aforementioned requirements relating to the chemical composition and particle size (for example, oxide particles having a diameter that is less than 1.0 μm, and oxide particles having a diameter that is more than 5.0 μm) is preferably reduced as much as possible. However, in a non-oriented electrical steel sheet and a hot-rolled steel sheet having the aforementioned chemical composition, in a case where the number density N of the suitable oxide particles is controlled to be $3.0\times10^3$ to $10\times10^3$ particles/cm$^2$, elements that serve as a supply source for oxides are consumed in order to form the suitable oxide particles. In this case, the formation of oxide particles that do not satisfy the aforementioned requirements such as, for example, oxide particles having a diameter that is less than 1.0 μm and oxide particles having a diameter that is more than 5.0 μm is necessarily suppressed. Accordingly, there is no necessity to define the number density of oxide particles that do not satisfy the aforementioned requirements.

In addition, in the non-oriented electrical steel sheet according to the present embodiment, among the suitable oxide particles, a number density n of oxide particles containing one or more elements selected from a group consisting of La, Ce, Zr, Mg and Ca in a total amount of, 1.0% by mass or more satisfies the following Formula (i).

$$n/N \geq 0.01 \quad \text{(i)}$$

La, Ce, Zr, Mg and Ca (hereinafter, also referred to as "La and the like") form not only an oxide but also a sulfide, and inclusions formed from a single element of those are coarse, with a diameter of 5 μm or more. In contrast, oxide particles containing O and Si as main components are relatively fine with a diameter of 1.0 to 5.0 μm and can exist in a dispersed state as mentioned above. Here, by compositely containing La and the like in oxide particles mainly composed of O and Si, these elements can be dispersed at a high density which cannot be achieved with oxides or sulfides of La and the like. Further, it is considered that La and the like combine with S that is an impurity element to form a sulfide on the oxide, and thus can efficiently and stably make S harmless.

The aforementioned effect is obtained in a case where the concentration of La and the like in the suitable oxide particles is, in total, 1.0% by mass or more. Further, the number density n of suitable oxide particles that contain La and the like (hereinafter, also referred to as "oxide particles containing La and the like") is 1% or more of the number density N of the suitable oxide particles. In other words, the value of n/N is 0.01 or more. The concentration of La and the like in the suitable oxide particles may be, in total, 5.0% by mass or more, 10.0% by mass or more, or 20.0% by mass or more.

Note that, the number density N of the suitable oxide particles is measured by the following procedure. The oxide particles included in the non-oriented electrical steel sheet or the hot-rolled steel sheet are observed using a scanning electron microscope (SEM). The observation magnification is set to ×1000. The area of the observation visual field is set to 25 mm$^2$, and the number of observation points is set to four points (that is, the total area of the observation visual fields is 100 mm$^2$). Here, the chemical composition of each oxide is measured by an energy dispersive X-ray spectroscope (EDS) attached to the SEM, and it is determined whether or not each oxide contains, in mass %, O: 20 to 60% and Si: 20 to 60%.

Next, the equivalent circular diameter of the cross-sectional area of each oxide is regarded as the diameter of the oxide, and whether or not the equivalent circular diameter of each oxide is 1.0 to 5.0 μm is determined by image analysis of an electron micrograph obtained using a transmission electron microscope (TEM). Based on these results, oxide particles containing, in mass %, O: 20 to 60% and Si: 20 to 60% and having a diameter of 1.0 to 5.0 μm are regarded as suitable oxide particles, and the positions of the suitable oxide particles in each electron micrograph are identified. The number density of the suitable oxide particles is then calculated by dividing the number of the suitable oxide particles included in all the electron micrographs by the total sum of visual field areas of all the electron micrographs. Note that in some cases, multiple oxide particles may be observed in agglomeration, and in such a case, the equivalent circular diameters are measured individually, and each oxide particle having a diameter of 1.0 to 5.0 μm is determined as being a suitable oxide particle, and the number of the oxide particles are all counted.

Further, a ratio (n/N) of the number density n of oxide particles containing La and the like with respect to the number density N of the suitable oxide particles is determined by the following procedure. An energy dispersive X-ray spectroscope (EDS) attached to the TEM is used to measure the chemical composition of each of the suitable oxide particles, and it is then determined whether or not each suitable oxide is an oxide containing 1.0% by mass or more in total of one or more elements selected from the group consisting of La, Ce, Zr, Mg and Ca. Each oxide that is a suitable oxide particle and that contains 1.0% by mass or more in total of one or more elements selected from the group consisting of La, Ce, Zr, Mg and Ca is regarded as an oxide containing La and the like, and the positions of the oxide particles containing La and the like are identified in each electron micrograph. The ratio (n/N) that the oxide particles containing La and the like occupy among the number of the suitable oxide particles is then calculated by dividing the number of oxide particles containing La and the like included in all the electron micrographs by the entire number of the suitable oxide particles.

Further, in order to cause the suitable oxide particles to uniformly disperse without agglomerating, preferably the average spacing between the suitable oxide particles is made 30 to 300 μm. By making the average spacing between the suitable oxide particles 30 μm or more, the occurrence of an agglomerative distribution of the suitable oxide particles is suppressed, and the effect of making MnS harmless can be exhibited more reliably. Further, the occurrence of a deterioration in the mechanical properties and electromagnetic properties of the non-oriented electrical steel sheet at a portion where suitable oxide particles are agglomerated can be suppressed. Therefore, the average spacing between the suitable oxide particles is preferably 30 μm or more.

Similarly, when the average spacing between the suitable oxide particles is 300 μm or less, because the suitable oxide particles are in a moderately dispersed state, it is possible to sufficiently secure precipitation sites for MnS. Thus, the average spacing between the suitable oxide particles is preferably 300 μm or less. The average spacing between the suitable oxide particles is more preferably 35 μm or more, 40 μm or more, or 50 μm or more. Further, the average spacing between the suitable oxide particles is more preferably 280 μm or less, 250 μm or less, or 220 μm or less.

The average spacing of the suitable oxide particles is determined by measuring the distances between the suitable oxide particles based on information regarding the particle sizes and positions of the suitable oxide particles in each electron micrograph that are identified by the aforementioned procedures, and calculating the average value of the distances measured. Note that when multiple oxide particles are observed in agglomeration, the distance may be 0 because the appropriate oxide particles are attached to each other. However, in the present invention, in such a case, a value of a distance of 0 is not used in the calculation of the average value. That is, even when the number density of oxide particles is the same, in a case where partial agglomeration occurs the average spacing increases.

3. Crystal Grain Size

The crystal grain size in the non-oriented electrical steel sheet according to the present embodiment is not particularly defined. As mentioned above, the non-oriented electrical steel sheet is used after undergoing machining and stress relief annealing, and the crystal grain size varies according to the conditions of the stress relief annealing. Taking into consideration the actual conditions of usage described above, as long as the grain growth properties during the stress relief annealing are good, it is not essential to define the crystal grain size at the stage of the non-oriented electrical steel sheet. However, when the average crystal grain size is made 30 μm or less, the punchability improves. Therefore, the average crystal grain size may be defined as 30 μm or less. A known technique can be appropriately used as means for making the average crystal grain size 30 μm or less.

Generally, non-oriented electrical steel sheets are subjected to machining and stress relief annealing after shipment. When the average crystal grain size after this stress relief annealing is 50 μm or more, the iron loss characteristics are extremely improved. Because the chemical composition and the state of oxides of the non-oriented electrical steel sheet according to the present embodiment are controlled to be within the preferable ranges, the average crystal grain size after performing stress relief annealing under conditions in which the non-oriented electrical steel sheet is held at 750° C. for two hours is 50 μm or more. Note that, for actual products, conditions for performing stress relief annealing are not limited to the aforementioned condition, and the annealing temperature and time may be appropriately changed in consideration of both equipment constraints and promotion of grain growth.

The average crystal grain size of the non-oriented electrical steel sheet can be determined by the following method. An L cross section (cross section parallel to the rolling direction) of the non-oriented electrical steel sheet is subjected to polishing and etching, and then observed using an optical microscope. The observation magnification is set to ×100, the area of the observation visual field is set to 0.5 $mm^2$, and the number of observation points is set to three points. The average crystal grain size of the non-oriented electrical steel sheet is then determined by applying the method described in "Steels—Micrographic Determination of the Apparent Grain Size" specified in JIS G 0551:2013 to these optical micrographs.

4. Production Method

A method of producing the non-oriented electrical steel sheet according to the present embodiment includes a refining process, a continuous casting process, a hot rolling process, a pickling process, a cold rolling process, and a finish annealing process. Among these, in particular the refining process and the continuous casting process are important for controlling oxide particles.

(a) Refining Process

In the refining process, molten steel is produced. The present process is a process that adjusts the components of a slab by adding alloying elements to the molten steel. After the addition of a predetermined alloy to the molten steel is completed, by undergoing the continuous casting process that is described later, the amount of oxide particles produced gradually increases until the molten steel solidifies. In addition, oxide particles that float up and are incorporated into the slag are also produced. Therefore, in order to make the number density of suitable oxide particles $3.0\times10^3$ to $10\times10^3$ particles/$cm^2$, first the oxygen amount of the molten steel before alloy addition is adjusted to, in mass %, 0.010 to 0.050%. If the oxygen amount is insufficient, the number density of the oxide particles that are produced will be insufficient. On the other hand, if the oxygen amount is excessive, the number density of oxide particles will excessively increase, and oxide particles will agglomerate.

Next, Si is added to the molten steel. Here, addition of Si is performed so that an amount M1 (mass %) of Si added to the molten steel, and a content M2 of Si (mass %) in the slab that is ultimately obtained in the continuous casting process thereafter satisfy the following Formula (ii). Here, the amount M1 of Si added to the molten steel is a value (%) obtained by dividing the total mass of Si added to the molten steel by the total mass of the molten steel. The term "content M2 of Si in the slab" refers to the content of Si in the chemical composition of the slab, and is substantially the same as the content of Si in a hot-rolled steel sheet and a non-oriented electrical steel sheet obtained from the slab.

$$0.90 \le M2/M1 \le 1.10 \qquad \text{(ii)}$$

In a case where the content M2 of Si in the slab is too small relative to the amount M1 of Si added to the molten steel and is less than 0.90 times the value of M1, a large amount of Si is incorporated into the slag as $SiO_2$ and is discharged to outside of the molten steel, and consequently Si deoxidation proceeds too much. Therefore, the number density of oxide particles in the slab cannot be made to fall within the preferable range. On the other hand, in a case where the content M2 of Si in the slab is too large relative to the amount M1 of Si added to the molten steel and is more than 1.10 times the value of M1, Si deoxidation does not proceed, and the number of oxide particles excessively increases and agglomeration of oxides and the like occurs.

Note that, as mentioned above, the content M2 of Si in the molten steel is a value that is substantially the same as the content of Si in the hot-rolled steel sheet and non-oriented electrical steel sheet which are ultimately obtained. Accordingly, the content M2 of Si in the molten steel is to be 0.10 to 1.50%.

Further, the time period from when alloy addition ends until the continuous casting process is started is preferably set to 30 minutes or more in consideration of the time required to cause coarse oxide particles to float up from the molten steel. Further, if the time period from when alloy addition ends until the continuous casting process is started is too long, fine oxide particles will not remain in the molten steel, and therefore, from the viewpoint of securing such fine oxide particles, the time period from the end of alloy addition until casting is preferably 180 minutes or less. By adjusting the amount of O before alloy addition within this time range as well as the added amount of Si, the suitable average spacing that is defined above can be obtained.

(b) Continuous Casting Process

The molten steel produced in the refining process is subjected to continuous casting in the continuous casting process to produce a slab having the chemical composition described above. The present process is an important process for causing La and the like to be contained in some of the suitable oxide particles. When La and the like are added by means such as introduction of mischmetal, a violent reaction occurs between these elements and the molten steel, and a significant decrease in the amount of oxygen in the steel as well as mixing of impurity elements contained in the slag into the molten steel occurs. Furthermore, the oxides that are produced are also very coarse, with a diameter of more than 5 μm.

Therefore, in the production method according to the present embodiment, a nozzle is used in the continuous casting process, a part or all of an inner wall of the nozzle that comes in contact with the molten steel being constituted by a material in which oxide particles containing La and the like are contained in a total amount of 3 to 60% in mass %. La and the like are supplied into the steel as a result of the inner wall of the nozzle that comes in contact with the molten steel undergoing melting loss. When La and the like are caused to be contained in the molten steel by using this technique, the oxygen in the steel and the slag are not affected, and compounding of these elements with oxide particles mainly composed of Si that are formed thereafter is achieved, and sulfides can be efficiently made harmless.

(c) Hot Rolling Process

In the hot rolling process, the slab obtained by the continuous casting process is heated, and thereafter is subjected to hot rolling to obtain a hot-rolled steel sheet. A hot-rolled steel sheet according to one embodiment of the present invention is produced by the present process. Note that, the processes after the hot rolling process do not substantially affect the chemical composition and the state of the oxides. Therefore, as mentioned above, the chemical composition and state of oxides of the hot-rolled steel sheet are common with the chemical composition and state of oxides of the non-oriented electrical steel sheet according to the present embodiment.

By making the slab heating temperature before hot rolling less than 1150° C., it is possible to uniformly disperse the suitable oxide particles and adjust the average spacing between the suitable oxide particles to be within the suitable range. Therefore, the slab heating temperature is preferably set to less than 1150° C. Further, from the viewpoint of securing rollability, a lower limit of the slab heating temperature before hot rolling is preferably made 1050° C. In addition, preferably hot rolling of the slab is performed immediately after being held for 15 to 240 minutes in a temperature range of 1050° C. or more to less than 1150° C.

Note that, although the rolling reduction in the hot rolling process is not particularly limited, the rolling reduction is preferably 90% or more. Further, although the thickness of the hot-rolled steel sheet that is obtained is also not particularly limited, preferably the thickness is 1.0 to 4.0 mm, and more preferably is 2.0 to 3.0 mm.

(d) Pickling Process

In the pickling process, the hot-rolled steel sheet obtained by performing the hot rolling process is subjected to pickling. The pickling conditions are not particularly limited, and it suffices to set the pickling conditions within a normal range with respect to conditions for producing a non-oriented electrical steel sheet.

(e) Cold Rolling Process

In the cold rolling process, the hot-rolled steel sheet that was subjected to pickling is subjected to cold rolling to obtain a cold-rolled steel sheet. The cold rolling conditions are not particularly limited, and it suffices to set the cold rolling conditions within a normal range with respect to conditions for producing a non-oriented electrical steel sheet. For example, with regard to the rolling reduction in the cold rolling process, the rolling reduction is preferably set within a range of 50 to 95%, and more preferably within a range of 75 to 85%.

(f) Finish Annealing Process

In the finish annealing process, the cold-rolled steel sheet obtained by performing the cold rolling process is subjected to finish annealing. In the finish annealing process, if the highest temperature reached (temperature of cold-rolled steel sheet) is 850° C. or more, the crystal grain sizes will be too large, and there is a possibility that defects will occur during punching that is performed before stress relief annealing. To avoid such a situation, the highest temperature reached is preferably made less than 850° C. Further, if the highest temperature reached is less than 800° C., there is a possibility that recrystallization will be insufficient and defects may occur during the punching. To avoid such a situation, the highest temperature reached is preferably made 800° C. or more. Further, in order to avoid a situation in which the crystal grain sizes become too large and defects occur during the punching that is performed before stress relief annealing, preferably a time period for which the temperature of the cold-rolled steel sheet is 800° C. or more is set to 15 seconds or less.

Although the thickness of the non-oriented electrical steel sheet produced by undergoing the processes described above is not particularly limited, the thickness is preferably 0.1 to 1.0 mm, and more preferably is 0.2 to 0.7 mm.

Hereunder, the present invention is described more specifically by way of Examples, although the present invention is not limited to these Examples.

EXAMPLES

Slabs were produced by performing a refining process and a continuous casting process under various conditions, and non-oriented electrical steel sheets were manufactured by performing a hot rolling process, a pickling process, a cold rolling process, and a finish annealing process in this order on the obtained slabs. The chemical compositions of the non-oriented electrical steel sheets are shown in Table 1, and the production conditions employed to produce the non-oriented electrical steel sheets are shown in Table 2. Note that, each of the respective steel sheets was produced five times under the same conditions. Further, for all of the steel sheets, a time period for which the temperature of the steel sheet was 800° C. or more in the finish annealing process was 15 seconds or less.

With the exception of Test No. 24, the content of La, Ce, Zr, Mg, and Ca in the steel was adjusted using only the melting loss of the nozzle material in the continuous casting process. On the other hand, with regard to Test No. 24, adjustment of the components was performed by adding alloying elements to the molten steel in the refining process.

TABLE 1

| | Chemical Composition (mass %, balance: Fe and impurities) | | | | | | | | |
|---|---|---|---|---|---|---|---|---|---|
| Steel | C | Si | Mn | sol. Al | N | S | O | Sn | Others |
| A1 | 0.0031 | 0.33 | 0.22 | 0.0045 | 0.0023 | 0.0032 | 0.0175 | 0.010 | Ca: 0.007 |
| A2 | 0.0028 | 0.45 | 0.34 | 0.0038 | 0.0026 | 0.0029 | 0.0165 | — | Mg: 0.008 |
| A3 | 0.0035 | 0.56 | 0.17 | 0.0031 | 0.0024 | 0.0023 | 0.0145 | 0.058 | Ce: 0.004 |
| A4 | 0.0046 | 0.77 | 0.44 | 0.0026 | 0.0021 | 0.0021 | 0.0121 | 0.006 | La: 0.010 |
| A5 | 0.0033 | 0.89 | 0.53 | 0.0022 | 0.0019 | 0.0027 | 0.0102 | 0.034 | Zr: 0.005, Ca: 0.001 |
| A6 | 0.0022 | 1.21 | 0.67 | 0.0034 | 0.0026 | 0.0024 | 0.0096 | 0.319 | Ca: 0.001, Mg: 0.013 |
| A7 | 0.0037 | 1.33 | 1.45 | 0.0032 | 0.0026 | 0.0018 | 0.0085 | 0.411 | Mg: 0.013, Ce: 0.006 |
| A8 | 0.0043 | 1.48 | 1.21 | 0.0043 | 0.0021 | 0.0021 | 0.0065 | 0.234 | Ce: 0.006, Mg: 0.008 |
| a1 | 0.0029 | 0.05 | 0.13 | 0.0030 | 0.0022 | 0.0019 | 0.0189 | — | Mg: 0.008, Zr: 0.005 |
| a2 | 0.0036 | 0.22 | 0.67 | 0.0124 | 0.0017 | 0.0031 | 0.0178 | 0.023 | Zr: 0.005, Ca:0.001 |
| a3 | 0.0025 | 0.45 | 0.55 | 0.0032 | 0.0028 | 0.0025 | 0.0035 | 0.045 | Ca: 0.001, Mg:0.008 |
| a4 | 0.0021 | 0.67 | 0.35 | 0.0021 | 0.0029 | 0.0035 | 0.0267 | 0.051 | Mg: 0.008, Zr: 0.005 |
| a5 | 0.0041 | 1.67 | 1.33 | 0.0034 | 0.0020 | 0.0037 | 0.0056 | 0.072 | Zr: 0.005, La: 0.010 |
| a6 | 0.0032 | 0.55 | 1.78 | 0.0042 | 0.0025 | 0.0022 | 0.0157 | 0.344 | La: 0.010, Zr: 0.005 |
| a7 | 0.0025 | 0.35 | 0.21 | 0.0031 | 0.0023 | 0.0056 | 0.0178 | 0.452 | Zr: 0.005, Ca: 0.001 |
| a8 | 0.0032 | 1.02 | 0.98 | 0.0025 | 0.0042 | 0.0035 | 0.0135 | 0.002 | Ca: 0.001, Zr: 0.004 |
| a9 | 0.0036 | 1.34 | 1.12 | 0.0037 | 0.0027 | 0.0020 | 0.0087 | 0.021 | — |

TABLE 2

| | | Refining process | | | | | | Hot rolling process | | | Cold rolling process | Finish annealing process |
|---|---|---|---|---|---|---|---|---|---|---|---|---|
| Test No. | Steel | Oxygen amount of molten steel before alloy addition (mass %) | Amount M1 of added Si (mass %) | Content M2 of Si (mass %) | M2/M1 | Time from alloy addition end to continuous casting process start (min) | Continuous casting process Nozzle material (mass %) | Slab heating temperature (° C.) | Slab holding time (min) | Hot rolling reduction (%) | Cold rolling reduction (%) | Highest temperature reached (° C.) |
| 1 | A1 | 0.0211 | 0.35 | 0.33 | 0.94 | 157 | CaO:10% | 1082 | 65 | 99 | 78 | 811 |
| 2 | A2 | 0.0231 | 0.48 | 0.45 | 0.94 | 133 | MgO:40% | 1112 | 34 | 99 | 80 | 822 |
| 3 | A3 | 0.0245 | 0.61 | 0.56 | 0.92 | 171 | CeO:30% | 1132 | 67 | 99 | 83 | 835 |
| 4 | A4 | 0.0313 | 0.78 | 0.77 | 0.99 | 105 | LaO:15% | 1145 | 201 | 99 | 82 | 841 |
| 5 | A5 | 0.0356 | 0.94 | 0.89 | 0.95 | 114 | ZrO:20%, CaO:10% | 1064 | 136 | 99 | 80 | 831 |
| 6. | A6 | 0.0389 | 1.22 | 1.21 | 0.99 | 98 | CaO:8%, MgO:20% | 1083 | 211 | 99 | 78 | 845 |
| 7 | A7 | 0.0432 | 1.28 | 1.33 | 1.04 | 66 | MgO:30%, CeO:30% | 1099 | 179 | 99 | 83 | 844 |
| 8 | A8 | 0.0489 | 1.37 | 1.48 | 1.08 | 143 | CeO:5%, MgO:20% | 1076 | 134 | 99 | 82 | 848 |
| 9 | a1 | 0.0194 | 0.05 | 0.05 | 1.00 | 54 | MgO:20%, ZrO:5% | 1054 | 152 | 99 | 78 | 804 |
| 10 | a2 | 0.0221 | 0.24 | 0.22 | 0.92 | 65 | ZrO:20%, CaO:8% | 1121 | 190 | 99 | 80 | 807 |
| 11 | | 0.0108 | 0.48 | 0.45 | 0.94 | 161 | CaO:15%, MgO:20% | 1090 | 164 | 99 | 82 | 813 |
| 12 | a4 | 0.0488 | 0.62 | 0.67 | 1.08 | 153 | MgO:20%, ZrO:4% | 1093 | 231 | 99 | 83 | 818 |
| 13 | a5 | 0.0421 | 1.85 | 1.67 | 0.90 | 178 | ZrO:5%, LaO:10% | 1124 | 194 | 99 | 80 | 834 |
| 14 | a6 | 0.0322 | 0.61 | 0.55 | 0.90 | 140 | LaO:10%, ZrO:20% | 1142 | 146 | 99 | 83 | 820 |
| 15 | a7 | 0.0231 | 0.36 | 0.35 | 0.97 | 102 | ZrO:4%, CaO:8% | 1129 | 153 | 99 | 82 | 802 |
| 16 | a8 | 0.0177 | 1.03 | 1.02 | 0.99 | 55 | CaO:40%, ZrO:20% | 1067 | 114 | 99 | 80 | 833 |
| 17 | a9 | 0.0465 | 1.48 | 1.34 | 0.91 | 177 | — | 1053 | 153 | 99 | 78 | 840 |
| 18 | A1 | 0.0089 | 0.33 | 0.33 | 1.00 | 160 | CaO:10% | 1080 | 60 | 99 | 78 | 830 |
| 19 | A2 | 0.0550 | 0.43 | 0.45 | 1.05 | 132 | MgO:40% | 1110 | 31 | 99 | 80 | 833 |
| 20 | A3 | 0.0245 | 0.64 | 0.56 | 0.88 | 170 | CeO:30% | 1130 | 71 | 99 | 83 | 830 |
| 21 | A4 | 0.0313 | 0.68 | 0.77 | 1.13 | 110 | LaO:15% | 1140 | 199 | 99 | 82 | 840 |
| 22 | A5 | 0.0354 | 0.93 | 0.89 | 0.96 | 15 | ZrO:20%, CaO:10% | 1160 | 140 | 99 | 80 | 824 |
| 23 | A6 | 0.0367 | 1.21 | 1.21 | 1.00 | 200 | CaO:8%, MgO:20% | 1081 | 209 | 99 | 78 | 840 |
| 24 | A7 | 0.0359 | 1.26 | 1.33 | 1.06 | 66 | — | 1097 | 179 | 99 | 83 | 844 |

TABLE 2-continued

| | | Refining process | | | | | | Hot rolling process | | | Cold rolling process | Finish annealing process |
|---|---|---|---|---|---|---|---|---|---|---|---|---|
| Test No. | Steel | Oxygen amount of molten steel before alloy addition (mass %) | Amount M1 of added Si (mass %) | Content M2 of Si (mass %) | M2/M1 | Time from alloy addition end to continuous casting process start (min) | Continuous casting process Nozzle material (mass %) | Slab heating temperature (° C.) | Slab holding time (min) | Hot rolling reduction (%) | Cold rolling reduction (%) | Highest temperature reached (° C.) |
| 25 | A8 | 0.0421 | 1.35 | 1.48 | 1.10 | 143 | CeO:5%, MgO:20% | 1180 | 130 | 99 | 82 | 844 |
| 26 | A1 | 0.0214 | 0.34 | 0.33 | 0.97 | 150 | CaO:10% | 1082 | 320 | 99 | 78 | 814 |
| 27 | A1 | 0.0233 | 0.36 | 0.33 | 0.92 | 115 | CaO:10% | 1110 | 35 | 99 | 80 | 870 |

For each obtained non-oriented electrical steel sheet, the number density N of the suitable oxide particles, the ratio (n/N) of the number density n of oxide particles containing La and the like to the number density N of the suitable oxide particles, the average spacing of suitable oxide particles, and the average crystal grain size were measured by the methods described hereunder. The measured values obtained from the five steel sheets were then averaged, and the resulting values were adopted as the respective measurement results of each test No.

The oxide particles contained in the non-oriented electrical steel sheet were observed at an observation magnification of ×1000 using an SEM. The area of the observation visual field was set to 25 $mm^2$, and the number of observation points was set to four points (that is, the total area of the observation visual fields was 100 $mm^2$). Here, the chemical composition of each oxide was measured by an EDS attached to the SEM, and whether or not the respective oxide particles contained, in mass %, O: 20 to 60% and Si: 20 to 60% was determined.

Further, the equivalent circular diameter of the cross-sectional area of the oxide was regarded as the diameter of the oxide, and whether or not the equivalent circular diameter of each oxide was 1.0 to 5.0 μm was determined by image analysis of an electron micrograph obtained using a TEM. Based on these results, oxide particles containing, in mass %, O: 20 to 60% and Si: 20 to 60% and having a diameter of 1.0 to 5.0 μm were regarded as suitable oxide particles, and the positions of the suitable oxide particles in each electron micrograph were identified. The number density of the suitable oxide particles was then calculated by dividing the number of the suitable oxide particles included in all the electron micrographs by the total sum of visual field areas of all the electron micrographs.

Further, an EDS attached to the TEM was used to measure the chemical composition of each of the suitable oxide particles, and it was then determined whether or not each suitable oxide was an oxide containing 1.0% by mass or more in total of one or more elements selected from the group consisting of La, Ce, Zr, Mg and Ca. The oxide which was a suitable oxide particle and which contained 1.0% by mass or more in total of one or more elements selected from the group consisting of La, Ce, Zr, Mg and Ca was regarded as an oxide containing La and the like, and the positions of the oxide particles containing La and the like were identified in each electron micrograph. The ratio (n/N) that the oxide particles containing La and the like occupied among the number of the suitable oxide particles was then calculated by dividing the number of oxide particles containing La and the like included in all the electron micrographs by the entire number of the suitable oxide particles.

The distances between suitable oxide particles were measured based on information regarding the particle sizes and positions of the suitable oxide particles in each electron micrograph that were identified by the aforementioned procedures, and the average spacing between the suitable oxide particles was determined by calculating the average value of the measured distances.

In addition, an L cross section of each non-oriented electrical steel sheet was subjected to polishing and etching, and then observed using an optical microscope. The observation magnification was set to ×100, the area of the observation visual field was set to 0.5 $mm^2$, and the number of observation points was set to three points. The average crystal grain size of the non-oriented electrical steel sheet was then determined by applying the method described in "Steels—Micrographic Determination of the Apparent Grain Size" specified in JIS G 0551: 2013 to these optical micrographs.

Next, the obtained non-oriented electrical steel sheet was subjected to stress relief annealing in which the non-oriented electrical steel sheet was held at 750° C. for two hours. The characteristics of the non-oriented electrical steel sheet after the stress relief annealing were then evaluated as described hereunder.

(A) Iron loss after Stress Relief Annealing

The iron loss (W15/50) of the steel sheet after the aforementioned stress relief annealing was measured in accordance with a method specified in JIS C 2552:2014 "Non-oriented magnetic steel sheet and strip". If W15/50 of the steel sheet after stress relief annealing was 5.0 W/kg or less, the non-oriented electrical steel sheet was determined as being excellent in iron loss characteristics after stress relief annealing.

(B) Magnetic Flux Density after Stress Relief Annealing

The magnetic flux density ($B_{50}$) of the steel sheet after the aforementioned stress relief annealing was measured in accordance with a method specified in JIS C 2552:2014 "Non-oriented magnetic steel sheet and strip". If $B_{50}$of the steel sheet after stress relief annealing was 1.70 T or more, the non-oriented electrical steel sheet was determined as being excellent in magnetic flux density after stress relief annealing.

(C) Grain Growth Properties in Stress Relief Annealing

The average crystal grain size of the steel sheet after the aforementioned stress relief annealing was measured using the same method as the method for measuring the average crystal grain size of a non-oriented electrical steel sheet that is described above. Non-oriented electrical steel sheets for which the average crystal grain size after the stress relief annealing was 50 μm or more were determined as having good grain growth properties in stress relief annealing.

(D) Punchability

Evaluation of punchability was performed using the non-oriented electrical steel sheet after finish annealing but before performing stress relief annealing. Specifically, the steel sheet was punched with a clearance of 7% or more to 12% or less of the sheet thickness. The burr height at the punched portion was measured. For specimens for which the burr height was 30 μm or less, it was determined that the punchability was "good" (symbol A). For specimens for which the burr height was more than 30 μm to 100 μm or less, it was determined that the punchability was "acceptable" (symbol B). For specimens for which the burr height was more than 100 μm, it was determined that the punchability was "unacceptable" (symbol C).

The results of the above evaluations are shown in Table 3.

In Test Nos. 18 to 21, because the production conditions were not suitable, the number density of suitable oxide particles was outside the defined range, and as a result the iron loss deteriorated. In addition, in Test No. 24, because adjustment of the components was performed by adding Mg and Ce to the molten steel in the refining process, and without utilizing melting loss of the nozzle material, oxide particles containing La and the like were not sufficiently formed. Consequently, even though the average value of iron loss was low, the maximum value of iron loss was high because MnS could not be made harmless stably.

INDUSTRIAL APPLICABILITY

According to the present invention, a non-oriented electrical steel sheet which has good grain growth properties during stress relief annealing and which is excellent in magnetic properties can be stably provided at a low cost. Accordingly, the present invention has very high industrial applicability.

TABLE 3 TABLE 3

| Test No. | Steel | Sheet thickness (mm) | Number density N of suitable oxide particles ($\times 10^3$/cm$^2$) | n/N | Average spacing between suitable oxide particles (μm) | Average crystal grain: After finish annealing (μm) | Average crystal grain: After stress relief annealing (μm) | Magnetic properties: Iron loss W15/50 Average value | Magnetic properties: Iron loss W15/50 Maximum value | Magnetic properties: Magnetic flux density Average value | Magnetic properties: Magnetic flux density Minimum value | Punchability | |
|---|---|---|---|---|---|---|---|---|---|---|---|---|---|
| 1 | A1 | 0.50 | 3.0 | 0.02 | 280 | 20 | 55 | 3.7 | 4.5 | 1.72 | 1.71 | A | Inventive example |
| 2 | A2 | 0.35 | 4.0 | 0.03 | 240 | 10 | 60 | 3.5 | 4.3 | 1.75 | 1.74 | A | Inventive example |
| 3 | A3 | 0.50 | 5.0 | 0.04 | 230 | 23 | 64 | 4.2 | 4.6 | 1.77 | 1.75 | A | Inventive example |
| 4 | A4 | 0.35 | 6.0 | 0.09 | 210 | 21 | 56 | 4.1 | 4.5 | 1.76 | 1.74 | A | Inventive example |
| 5 | A5 | 0.50 | 4.0 | 0.04 | 100 | 22 | 53 | 3:8 | 4.3 | 1.75 | 1.73 | A | Inventive example: |
| 6 | A6 | 0.35 | 3.5 | 0.02 | 80 | 24 | 55 | 3.7 | 3.9 | 1.74 | 1.72 | A | Inventive example |
| 7 | A7 | 0.50 | 3.2 | 0.22 | 70 | 22 | 67 | 3.3 | 3.5 | 1.74 | 1.72 | A | Inventive example |
| 8 | A8 | 0.35 | 5.4 | 0.08 | 100 | 21 | 65 | 4.3 | 4.6 | 1.73 | 1.71 | A | Inventive example |
| 9 | a1 | 0.50 | 2.0 | 0.05 | 200 | 29 | 32 | 6.8 | 7.6 | 1.71 | 1.70 | A | Comparative example |
| 10 | a2 | 0.35 | 1.0 | 0.03 | 250 | 10 | 23 | 6.5 | 7.4 | 1.75 | 1.73 | A | Comparative example |
| 11 | a3 | 0.50 | 0.5 | 0.01 | 300 | 21 | 25 | 6.4 | 7.3 | 1.77 | 1.75 | A | Comparative example |
| 12 | a4 | 0.35 | 15 | 0.03 | 20 | 22 | 32 | 5.8 | 6.7 | 1.76 | 1.74 | A | Comparative example |
| 13 | a5 | 0.50 | 3.0 | 0.04 | 120 | 32 | 54 | 4.5 | 4.8 | 1.68 | 1.66 | B | Comparative example |
| 14 | a6 | 0.35 | 3.7 | 0.05 | 310 | 31 | 32 | 7.1 | 7.9 | 1.71 | 1.70 | B | Comparative example |
| 15 | a7 | 0.50 | 5.3 | 0.02 | 200 | 24 | 31 | 7.5 | 8.3 | 1.71 | 1.70 | A | Comparative example |
| 16 | a8 | 0.35 | 4.2 | 0.02 | 160 | 29 | 33 | 7.4 | 8.8 | 1.72 | 1.71 | A | Comparative example |
| 17 | a9 | 0.50 | 5.1 | — | 300 | 25 | 54 | 4.3 | 7.5 | 1.73 | 1.72 | A | Comparative example |
| 18 | A1 | 0.35 | 1.5 | 0.03 | 350 | 27 | 32 | 6.8 | 8.9 | 1.74 | 1.73 | A | Comparative example |
| 19 | A2 | 0.50 | 18 | 0.02 | 15 | 21 | 33 | 5.7 | 7.8 | 1.73 | 1.72 | A | Comparative example |
| 20 | A3 | 0.35 | 1.0 | 0.03 | 200 | 20 | 32 | 5.9 | 7.5 | 1.75 | 1.74 | A | Comparative example |
| 21 | A4 | 0.50 | 50 | 0.02 | 25 | 12 | 32 | 5.7 | 6.7 | 1.74 | 1.73 | A | Comparative example |
| 22 | A5 | 0.35 | 4.0 | 0.01 | 350 | 21 | 57 | 4.3 | 4.9 | 1.76 | 1.75 | A | Inventive example |
| 23 | A6 | 0.50 | 3.2 | 0.01 | 400 | 23 | 55 | 4.2 | 4.8 | 1.78 | 1.76 | A | Inventive example |
| 24 | A7 | 0.35 | 3.0 | 0.003 | 110 | 25 | 67 | 4.1 | 6.5 | 1.76 | 1.74 | A | Comparative example |
| 25 | A8 | 0.50 | 4.6 | 0.03 | 30 | 26 | 53 | 4.3 | 4.7 | 1.75 | 1.73 | A | Inventive example |
| 26 | A1 | 0.35 | 3.2 | 0.04 | 350 | 21 | 67 | 4.4 | 4.8 | 1.76 | 1.74 | A | Inventive example |
| 27 | A1 | 0.50 | 3.7 | 0.04 | 230 | 50 | 57 | 4.8 | 4.9 | 1.74 | 1.72 | C | Inventive example |

As shown in Table 3, it was found that in Test Nos. 1 to 8, 22, 23, and 25 to 27 that satisfied the requirements of the present invention, excellent magnetic properties were stably exhibited. On the other hand, in Test Nos. 9 to 16 whose chemical compositions did not satisfy the requirements of the present invention, the results showed that at least one of iron loss and magnetic properties deteriorated. Further, in Test No. 17, because the chemical composition did not contain any of La, Ce, Zr, Mg, and Ca, oxide particles containing La and the like were not formed. Consequently, even though the average value of iron loss was low, the maximum value of iron loss was high because MnS could not be made harmless stably.

The invention claimed is:

1. A non-oriented electrical steel sheet having a chemical composition comprising, in mass %, C: 0.0050% or less, Si: 0.10 to 1.50%, Mn: 0.10 to 1.50%, sol. Al: 0.0050% or less, N: 0.0030% or less, S: 0.0040% or less, O: 0.0050 to 0.0200%, Sn: 0.50% or less, and one or more of La, Ce, Zr, Mg and Ca: 0.0005 to 0.0200% in total, with the balance comprising Fe and impurities, wherein:

a number density N of oxide particles containing, in mass %, O: 20 to 60% and Si: 20 to 60%, and having a diameter of 1.0 to 5.0 μm is $3.0\times10^3$ to $10\times10^3$ particles/$cm^2$, and a number density n of oxide particles containing, in mass %, O: 20 to 60% and Si: 20 to 60%, and having a diameter of 1.0 to 5.0 μm and further containing one or more of La, Ce, Zr, Mg and Ca in a total amount of 1.0% by mass or more satisfies Formula (i) below:

$$n/N \geq 0.01. \quad \text{(i)}$$

2. The non-oriented electrical steel sheet according to claim 1, wherein:

an average spacing between the oxide particles is 30 to 300 μm.

3. The non-oriented electrical steel sheet according to claim 1, wherein:

an average crystal grain size is 30 μm or less, and an average crystal grain size after performing stress relief annealing under conditions of holding the non-oriented electrical steel sheet at 750° C. for two hours is 50 μm or more.

4. A method for producing the non-oriented electrical steel sheet according to claim 1, comprising:

a refining process of producing molten steel, a continuous casting process of subjecting the molten steel to continuous casting to produce a slab having a chemical composition according to claim 1, a hot rolling process of, after heating the slab that is obtained, performing hot rolling to obtain a hot-rolled steel sheet, a pickling process of performing pickling on the hot-rolled steel sheet, a cold rolling process of performing cold rolling on the hot-rolled steel sheet after pickling to obtain a cold-rolled steel sheet, and a finish annealing process of subjecting the cold-rolled steel sheet to finish annealing, wherein:

in the refining process, an oxygen amount of the molten steel before alloy addition is made, in mass %, 0.010 to 0.050%, and next, an amount M1 of Si added to the molten steel and a content M2 of Si in the slab are adjusted so as to satisfy Formula (ii) below; and a nozzle is used in the continuous casting process, a part or all of an inner wall of the nozzle that comes in contact with the molten steel comprising a material that contains, in a total amount of 3 to 60% by mass %, oxides containing one or more of La, Ce, Zr, Mg and Ca;

$$0.90 \leq M2/M1 \leq 1.10. \quad \text{(ii)}$$

5. The method for producing the non-oriented electrical steel sheet according to claim 4, wherein:

in the refining process, a time period from when alloy addition ends until the continuous casting process is started is within a range of 30 to 180 minutes; and in the hot rolling process, after holding a temperature of the slab within a range of 1050° C. or more to less than 1150° C. for 15 to 240 minutes, hot rolling of the slab is immediately performed.

6. The method for producing the non-oriented electrical steel sheet according to claim 4, wherein:

in the finish annealing process, a temperature of the cold-rolled steel sheet is made 800° C. or more to less than 850° C.

* * * * *